US011274841B2

(12) United States Patent
Bjørn (10) Patent No.: US 11,274,841 B2
(45) Date of Patent: Mar. 15, 2022

(54) HYBRID VENTILATION SYSTEM (71) Applicant: Airmaster A/S, Aars (DK)

(72) Inventor: Erik Bjørn, Nibe (DK)

(73) Assignee: Airmaster A/S, Aars (DK)

( * ) Notice: Subject to any disclaimer, the term of this patent is extended or adjusted under 35 U.S.C. 154(b) by 239 days.

(21) Appl. No.: 16/789,621

(22) Filed: Feb. 13, 2020

(65) Prior Publication Data
US 2020/0256572 A1 Aug. 13, 2020

(30) Foreign Application Priority Data

Feb. 13, 2019 (EP) ..................................... 19156951

(51) Int. Cl.
*F24F 11/00* (2018.01)
*F24F 3/16* (2021.01)
(Continued)

(52) U.S. Cl.
CPC .......... *F24F 11/0001* (2013.01); *F24F 7/007* (2013.01); *F24F 8/10* (2021.01); *F24F 12/001* (2013.01)

(58) Field of Classification Search
CPC ........ F24F 11/0001; F24F 11/77; F24F 11/65; F24F 11/81; F24F 13/28; F24F 13/14;
(Continued)

(56) References Cited

U.S. PATENT DOCUMENTS 5,119,987 A * 6/1992 Kobayashi ............... F24F 11/30
236/49.3
6,131,653 A * 10/2000 Larsson .................. F24F 3/153
165/228
(Continued)

FOREIGN PATENT DOCUMENTS

CN 101672512 A 3/2010
CN 203704237 U 7/2014
(Continued)

OTHER PUBLICATIONS

Extended European Search Report; European Patent Office; European Application No. 19156951.6; dated Jul. 26, 2019; 8 pages.
(Continued)

*Primary Examiner* — Steven S Anderson, II
(74) *Attorney, Agent, or Firm* — Taft Stettinius & Hollister LLP (57) ABSTRACT

The present invention relates to a decentralized hybrid ventilation. The ventilation system comprises a housing having an inlet channel and an outlet channel. A first fan is arranged in the inlet channel for providing an airflow into the room and a second fan is arranged in the outlet channel for providing an airflow out of the room. A heat exchanger and filters are arranged in said channels for exchanging heat between and for filtrating air flowing into the room and air flowing out of the room. Furthermore, the ventilation system comprises a first and a second service door each providing, when open, an opening between the room and one of said channels to diverge the airflow from primarily flowing through the air filters and/or heat exchanger. The ventilation system also comprises a control system configured for switching between different modes of operations.

13 Claims, 5 Drawing Sheets (51) Int. Cl.
*F24F 7/007* (2006.01)
*F24F 12/00* (2006.01)
*F24F 8/10* (2021.01)

(58) Field of Classification Search
CPC ........ F24F 13/20; F24F 8/10; F24F 2012/007; F24F 7/007; Y02B 30/56; Y02B 30/70
See application file for complete search history.

(56) References Cited

U.S. PATENT DOCUMENTS

| | | | | |
|---|---|---|---|---|
| 7,231,967 | B2* | 6/2007 | Haglid | ............... B25B 27/0042 |
| | | | | 165/231 |
| 2011/0088417 | A1* | 4/2011 | Kayser | ................. F24F 12/001 |
| | | | | 62/94 |

FOREIGN PATENT DOCUMENTS

| | | | |
|---|---|---|---|
| CN | 105444278 | B | 6/2018 |
| EP | 2366961 | A2 | 9/2011 |
| EP | 2492604 | A1 | 8/2020 |
| KR | 101521875 | B1 | 5/2015 |
| WO | 2000011410 | A1 | 3/2000 |
| WO | 2011132994 | A2 | 10/2011 |
| WO | 2012023686 | A1 | 2/2012 |
| WO | 2014083354 | A1 | 6/2014 |

OTHER PUBLICATIONS

Zgaga et al.; Development of a Decentralized and Compact Comfort Ventilation System with Highly Efficient Heat Recovery for Minimal Invasive Refurbishment of Buildings; 8 pages.

Viessmann home ventilation systems: Tailor-made solutions for new builds and modernization projects; Viessmann Climate of Innovation; Mar. 2015; 11 pages.

Products; Schüco; accessed on May 13, 2020; https://www.schueco.com/de-en/fabricators/products; 3 pages.

Ventilation systems; Schüco; accessed on May 13, 2020; https://www.schueco.com/de-en/fabricators/products/ventilation-systems; 9 pages.

Type Schoolair-D; TROX GmbH; accessed on May 13, 2020, https://www.trox.de/en/ceiling-units/type-schoolair-d-5bc4e1e85687c356, 10 pages.

* cited by examiner

HYBRID VENTILATION SYSTEM

CROSS-REFERENCE TO RELATED APPLICATIONS

This application is a U.S. Application of European Patent Application No. 19156951.6 filed on Feb. 13, 2019, which is incorporated herein by reference in its entirety.

FIELD OF THE INVENTION

The present invention relates to a hybrid ventilation system, more particularly to a decentralized balanced ventilation system configured to be operated in different modes of operation.

BACKGROUND OF THE INVENTION

Recent years' increase in energy prices and concern as to global heating has resulted in a focus on using energy in an efficient manner. Conventionally, heating or cooling of houses or other buildings involves a heat source or a heat sink which raises or reduces the temperature of the air in the building. Furthermore, the air inside the building must be renewed to maintain an acceptable air quality in the building, which can be achieved by balanced ventilation systems.

Balanced ventilation systems extract air from buildings and exhaust it to the outside, but also draws replacement air into the building, thus maintaining the air pressure within the building. Such systems therefore have one flow path for air coming into the building and another flow path for air being expelled from the building.

In colder environments, it is a goal to provide air within buildings which are warmer than the air outside. Therefore, the inside air is heated to a desired temperature via heating systems. In such environments, ventilation systems often comprise a heat recovery unit comprising a heat exchanger, such that some of the heat from the outgoing air flow is transferred into the incoming air flow to minimize heat losses in the exhausted air and reduce load as well as energy usage of the heating system.

In warmer environments, it is a goal to provide air within buildings which are colder than the air outside. Thus, the inside air is cooled to a temperature below the outside temperature and the heat exchanger can be used to cool down the warm incoming air by heat exchange with the cold outgoing air, again improving thermal efficiency and reducing load on the cooling system.

However, if no or little air conditioning is present, the inside temperature may gradually rise to equalise with the outside temperature during the day. If there is then any heating within the house such as sunlight streaming through a window and causing a local heating effect, the air temperature within the house may rise above that of the outside air. The incoming outside air is then further heated by the outgoing inside air in the heat exchanger, causing further heating within the house.

In international standards for indoor climate, and increase in national legislation, there are limits to allowable overheating, e.g. a maximum number of hours per year with a room temperature over e.g. 26° C. This means the overheating issue must be addressed.

For this reason, ventilation systems with heat exchangers are typically fitted with a bypass mechanism, whereby when certain conditions are met, one of the airstreams is switched to bypass the heat exchanger so as to prevent any further heat exchange. With no heat exchange taking place, the warmer air within the house is simply replaced with cooler air from outside and the temperatures inside and outside equalise. Such a bypass is advantageous since the additional control of the temperature does not require energy use.

Ventilation systems with a heat exchanger often comprise air filters, provided on both the air intake and room extract pathways of the ventilation system. The filters ensure that the heat exchanger surfaces are kept clean, thus maintaining a high level of heat exchange efficiency. Ventilation system further comprise service doors allowing access to the air filter, such that they can be exchanged when needed.

In warm periods, it is a benefit with regard to human comfort and energy conservation to use large volumes of outdoor air for cooling the building structures at night, where outdoor temperatures are generally lower than the indoor temperature. In many buildings in temperate climates, it is possible to avoid active cooling in this way, thus saving the cost and energy consumption of a cooling system. In other cases, it is possible to reduce the operation of a cooling system.

However, the electrical power consumption of ventilation systems can be very high. Due to the presence of filters and heat exchangers, the flow resistance to be overcome is quite high, and air needs to be driven through the balanced ventilation systems by electrically powered fans arranged in both the flow path for air coming into the building and the flow path for air being expelled from the building.

Hence, an improved ventilation system would be advantageous, and in particular a more energy efficient ventilation system capable of supplying large volumes of air at a minimum of electrical power consumption would be advantageous.

OBJECT OF THE INVENTION

It is an object of the present invention to provide a balanced ventilation system that solves the above mentioned problems of the prior art by providing an energy efficient balanced ventilation system, capable of supplying large volumes of air at a minimum of electrical power consumption.

SUMMARY OF THE INVENTION

Thus, the above described object and several other objects of the invention are intended to be obtained in a first aspect of the present invention by providing a decentralized hybrid ventilation system comprising a housing having
  an inlet channel for inletting air into a room and an outlet channel for outletting air from a room;
  a first fan arranged in the inlet channel for providing a controllable volumetric airflow through the inlet channel and a second fan arranged in the outlet channel for providing a controllable volumetric airflow through the outlet channel;
  a heat exchanger configured for exchanging heat between air flowing through the inlet channel and air flowing through the outlet channel;
  an air filter arranged in each channel upstream of the heat exchanger for filtering air flowing into the heat exchanger;
  a first service door and a second service door arranged in an outer wall of the housing, each have an open state and a closed state, wherein when in an open state
    the first service door provides an opening in the housing allowing air in the inlet channel to flow out of the inlet channel and circumvent the heat exchanger and/or the air filter arranged in the outlet channel; and the second service door provides an opening in the housing allowing air to flow into the housing and through the outlet channel, while circumventing the heat exchanger and/or the air filter arranged in the outlet channel; and a control system configured to selectively open and close the first service door and second service door using actuators.

Preferably, the control system is configured to switch between different modes of operations, wherein in a first mode of operation, the first and second service doors are both closed;

in a second mode of operation the first and the second service doors are both open; and in a third mode of operation, one service door is open while the other service door is closed.

The ventilation system according to the present invention can be operated in at least three modes of operation, wherein the first mode of operation is similar to that of conventional mechanical ventilation systems and the second and third modes of operation are energy saving modes with natural ventilation or mechanically assisted natural ventilation. Thus, the ventilation system is herein referred to as a "hybrid" ventilation system.

The ventilation system of the present invention is configured to be installed in a room to be ventilated. Thus, the ventilation system is a so-called decentralized ventilation system. A decentralized ventilation system is herein defined as a ventilation system configured to be placed directly in a room to be ventilated, close or on/in an external wall between the room to be ventilated and the external environment. In that way the transport distance of air from the room to the external environment through the ventilation system is short, preferably less than 10 meters. With a short transport distance, energy consumption is decreased, compared to centralized ventilation systems. Furthermore, a decentralized ventilation system is advantageous as the ventilation in each room can be separately controlled.

The ventilation system is also a balanced ventilation system, meaning that it is configured to extract air from a room and exhaust it to an external environment, but also draw replacement air into the room, thus maintaining the air pressure within the room.

In conventional ventilation systems, the service doors are never opened when the ventilation system is active, as an active ventilation system is quite noisy. The only functioning of the service doors is that they can be opened to allow access to the air filters, such that they can be exchanged when needed.

However, in the present invention, the ventilation system comprise a control system configured to control the state of the service doors using actuators arranged on the housing of the ventilation system, such that the control system can open and close the service doors.

As the ventilation system can work in different modes of operation, with zero, one or two service doors open, the ventilation system has several advantages which will be described below.

First Mode of Operation:

In a first mode of operation, when both service doors are closed, the ventilation system functions as a normal balanced ventilation system having a heat recovery unit.

The heat recovery unit is preferably a heat exchanger comprising a first heat exchange section extending inside the inlet channel and a second heat exchange section extending inside the outlet channel, wherein the first heat exchange section and the second heat exchange section are thermally coupled to exchange heat between the two sections.

The air filters referred to herein, arranged in the inlet channel and outlet channel, are preferably configured to filter particles with diameters larger than 10 μm to protect the heat exchanger. The filter in the inlet channel may even be configured to filter particles with diameters larger than 1 μm to protect the health of the occupants. Thus, such filters present an air resistance to be overcome for air to flow through the air filters.

However, the ventilation system may further comprise filters configured to prevent insects and particles larger than 0.1 mm, such as larger than 1 mm, to enter the ventilation system. Such filters may be arranged in the first inlet and the second outlet of the housing and does not provide a significant air resistance to be overcome for air flowing through such filters. Thus, if such filters are present, air will flow through them in all embodiments of the present invention.

The ventilation system is preferably configured such that when the first service door is closed, air is allowed to flow through a first inlet in the housing into the inlet channel, through the air filter arranged in the inlet channel, through the first section of the heat exchanger and out of the inlet channel through a first outlet in the housing. When the second service is door closed, air preferably flows through a second inlet in the housing into the outlet channel, through the air filter arranged in the outlet channel, through the second section of the heat exchanger and out of the outlet channel through a second outlet in the housing.

When the outside air is colder than the inside air, heat from the warmer outgoing air flow is transferred into the colder incoming air flow, in the first mode of operation. This minimizes heat losses in the exhausted air, thus reducing load and energy usage of the heating system. In warmer environments, where the inside air is colder than the outside air due to air conditioning, the warm incoming air flow is cooled by the cold outgoing air, again improving thermal efficiency and reducing load on the cooling system.

Due to the presence of air filters and the heat exchanger, the flow resistance in both the inlet channel and the outlet channel is quite high, and air need to be driven through the balanced ventilation systems by electrically powered fans arranged in both the flow path for air coming into the building and the flow path for air being expelled from the building.

Thus, the first and the second fans are preferably active in the first mode of operation.

Ventilation System with Bypass Mechanism:

The ventilation system of the present invention may comprise a bypass and a bypass mechanism, which may also be controlled by the control system. The bypass mechanism comprises an in-built, mechanically controlled door or blockage which can be controlled to allow fresh air or extract air to circumvent the heat exchanger by instead flowing through the bypass. In ventilation systems comprising a bypass mechanism, air may be able to flow through an air channel bypassing the heat exchanger, thereby reducing the energy consumption of the system.

In some embodiments of the present invention, the outlet channel and/or the inlet channel comprise a bypass passage allowing air to bypass the heat exchanger; and a bypass door configured to selectively close or open the bypass passage.

When the bypass door is open and the bypass passage allows air to bypass the heat exchanger, some air may still flow through the heat exchanger, but the flow resistance is lower through the bypass passage. Thus, air will primarily flow through the bypass passage.

In some embodiments, the bypass door when arranged to open the first bypass passage is arranged so as to prevent air from flowing into the heat exchanger. In this way, the bypass door is arranged to block the heat exchanger, so no air can flow through the heat exchanger in such embodiments.

Thus, in ventilation systems comprising a bypass mechanism in the inlet channel, air may be able to flow through the inlet channel while bypassing the heat exchanger, even though the first service door is not open, thereby reducing the energy consumption of the system. In the same way, in ventilation systems comprising a bypass mechanism in the outlet channel, air may be able to flow through the outlet channel while bypassing the heat exchanger, even though the first second door is not open, thereby reducing the energy consumption of the system.

In some embodiments, the ventilation system comprise a bypass mechanism in both the inlet channel and outlet channel.

The control system is configured to selectively open and close the bypass door using actuators.

Thus, the control system is preferably configured to perform the following steps:
  (i) individually open and close the first service door and the second service door;
  (ii) open and close the bypass door, if present; and
  (iii) individually change the discharge rate of the first fan and the second fan;
to switch between the different modes of operation.

Ventilation System with Bypass Mechanism in a First Mode of Operation:

If the ventilation system comprises a bypass passage and a bypass door, the bypass door may be open or closed in the first mode of operation.

When the bypass door is open and air is allowed to flow through the open bypass passage, no heat exchange will take place between air flowing in the inlet channel and air flowing in the outlet channel.

When the bypass door is closed and air is not allowed to flow through the open bypass passage, heat exchange will take place between air flowing in the inlet channel and air flowing in the outlet channel.

Second Mode of Operation:

In the second mode of operation, both service doors are open.

The service doors are arranged such that access to the air filters are possible. As the filters are always arranged such that air flows through the filters before it flows through the heat exchanger, an opening to the inlet channel is provided when a service door is opened, if the system is constructed with this possibility in mind.

Thus, the first service door, providing access to the air filter arranged in the inlet channel, allows air to flow into the inlet channel and out of the open service door into a room, without having to pass the air filter or the heat exchanger in the inlet channel.

The ventilation system is configured such that when the first service door is open, air is allowed to flow through a first inlet into the inlet channel and out of the inlet channel through the opening provided by the open service door, without flowing through the heat exchanger and/or without flowing through the air filter arranged in the inlet channel. Some air may flow through the first air filter and the heat exchanger, however, as the flow resistance is significantly decreased when air does not have to flow through the air filter and heat exchanger, air will primarily flow through the first opening provided by the open service door. As the resistance is decreased, the power of the electrically powered fan can be reduced without decreasing the volume of air flowing through the ventilation system. In the same way, the second service door, providing access to the air filter arranged in the outlet channel, allows air to flow through the open service door into the outlet channel and out of the outlet channel, without having to pass the air filter or the heat exchanger in the outlet channel.

Preferably, the ventilation system is configured such that when the second service door is open, air is allowed to flow into the outlet channel through the opening provided by the open second service door and out of the outlet channel through the second outlet, without flowing through the heat exchanger and/or without flowing through the air filter arranged in the outlet channel. In the same way as described above, the flow resistance is significantly decreased and the power of the electrically powered fan arranged in the outlet channel can be reduced without decreasing the volume of air flowing through the ventilation system.

Thus, in the second mode of operation, air flowing through the ventilation system is allowed to bypass both the air filters and/or the heat exchanger without any bypass mechanism being present in the ventilation system. As the flow resistance is significantly decreased in the ventilation system when air does not have to flow through air filters and heat exchanger, air will primarily flow through the openings provided by the open service doors. As the resistance is decreased, the power of the electrically powered fans can be reduced without decreasing the volume of air flowing through the ventilation system.

Thus, in the second mode of operation, one of the first fan and the second fan is less active than the other fan, such as inactive. In such embodiments, the ventilation system will work as a mechanically assisted natural ventilation system.

In some embodiments, both the first and the second fan are inactive in the second mode of operation. In such embodiments, the ventilation system will work as a natural ventilation system. Natural ventilation is only possible under certain conditions, thus the control system should be configured to receive input from different sensors arranged to detect for example wind and temperature conditions and based on these inputs, switch to natural ventilation when conditions allow it.

Preferably, the control system is configured to control the first and second fan to provide the controllable volumetric air flow through the inlet and outlet channels.

In this way, large amounts of fresh air can be inlet into a building through the ventilation system of the present invention when operated in a second mode, with an energy consumption which is reduced compared to the first mode of operation.

Ventilation System with Bypass Mechanism in a Second Mode of Operation:

In embodiments where the ventilation system comprises a bypass passage and a bypass door, the bypass door may be opened or closed in the second mode of operation. However, since air is allowed to bypass the heat exchanger in the second mode of operation independent of the state of the bypass door, it is not important whether the bypass door is opened or closed in this mode of operation.

Third Mode of Operation:

In a third mode of operation, either the first service door or the second service door is open.

This mode of operation is specifically advantageous in systems with a bypass mechanism. This will be described further in a section below.

Ventilation System with Bypass Mechanism in a Third Mode of Operation:

It may be advantageous to operate the system in a third mode of operation, if no heat exchange is required, but it is required that air flowing through the inlet channel is filtered.

In such embodiments, the first service door is closed, while the second service door and a bypass door arranged in the inlet channel are open. In that way, air flowing through the inlet channel flows through the air filter in the inlet channel, but bypasses the heat exchanger, whereas air flowing through the outlet channel bypasses both the air filter arranged in the outlet channel, as well as the heat exchanger, because the second service door is open.

Thus, reduced air flow resistance in the inlet channel is provided by the bypass mechanism, while reduced air flow resistance in the outlet channel is provided by the opened second service door.

In the third mode of operation, one of the first fan and the second fan is preferably less active than the other fan, such as inactive. In some embodiments, the first and/or the second fan are even inactive in the third mode of operation.

Use and Control of the Ventilation System of the Present Invention:

As an active ventilation system is noisy when the service doors are opened, the ventilation system with one or two open service doors and one or two active fans, is preferably used only when no one is present in the room to be ventilated.

The present invention may be particularly useful in office buildings, supermarkets, schools etc. where the ventilation system can be operated as a mechanical (no open service doors but two active fans) or natural ventilation system (two open service doors, no active fans) during the day and as a mechanical assisted natural ventilation system (one or two open service doors and one or two more or less active fans) during the night, or other hours, where no one is present in the building.

When occupants are not present in the building, filters are unnecessary. In addition, the heat exchanger is not needed, since it is counter-productive to recover heat in this situation. Thus, by the present invention, the inside of buildings can be ventilated and kept at a pleasant temperature, but a lot of energy can be saved with the present invention, compared to conventional ventilation systems.

In the ventilation system according to the present invention, it may also be possible to control the degree of cooling within the room to be ventilated, so it does not become too cold. Therefore, the ventilation system may further comprise sensors providing input to the control system, such that the service doors can be closed if the control system receives an input from the sensors indicating that the building are becoming too cold or too warm.

In some embodiments, the control system further comprises one or more temperature sensors arranged for detecting the temperature of air in the inlet channel and/or the outlet channel, wherein the control system is configured to switch between the different modes of operation in dependence on the detected temperature to achieve or maintain a target temperature accessible to the control system. One or more temperature sensors may also be arranged for detecting the temperature of air in a room to be ventilated or in the external environment outside the room.

Preferably, the control system is programmed to switch between the different modes of operation in a pre-determined frequence and/or in dependence of several inputs, such as the temperature in the inlet channel and/or outlet channel.

The control system can be programmed to open and close at the service doors at specific time points during the day or in response to different inputs from sensors, such as temperature sensors arranged in the room to be ventilated, on the housing of the ventilation system or in the inlet and/or outlet channel and sensors for detecting wind and/or moisture conditions. In the same way, the power of the fans and the state of the bypass door can be controlled by the control system to obtain the optimal ventilation based on preset conditions defining when different modes of operation are preferred.

Preferably, the control system is configured to perform the following steps:
(i) individually open and close the first service door and the second service door;
(ii) individually change the discharge rate of the first fan and the second fan, and
(iii) open and close the bypass door, if present,
to switch between different modes of operation, including the first and the second mode of operation.

The control system can manually be set to open and close the service doors and the bypass door at specific time points or in response to different inputs, such as temperature. Thus, the control system can be automatically operated and/or manually operated.

In some embodiments, the ventilation system comprises a user interface allowing a user to instruct the controller and/or to switch between the different modes of operation.

The novel features of the present invention can be applied to older ventilation systems, such that the older ventilation systems can become more energy efficient without having to exchange them with newer ventilation systems.

Thus, the present invention provides an improved ventilation system, and in particular a more energy efficient ventilation system capable of supplying large volumes of air at a minimum of electrical power consumption. This is obtained by the present invention having a control system configured to at least control the state of the service doors through actuators arranged on the ventilation system.

In a second aspect, the present invention refers to a master control system configured for controlling ventilation in a building, wherein the master control system is in communication with a plurality of ventilation systems according to the present invention.

As the ventilation system of the present invention is a decentralized ventilation system, each room in a building would theoretically need a ventilation system of its own. A master control system may be coupled to the plurality of ventilation systems in a building and control the mode of operation of each ventilation system based on input from different sensors arranged in and/or outside the building.

Embodiments of the present invention may each be combined with any of the other embodiments. These and other embodiments of the invention will be apparent from and elucidated with reference to the embodiments described hereinafter.

BRIEF DESCRIPTION OF THE FIGURES

The device according to the present invention will now be described in more details with regard to the accompanying figures. The figures show one way of implementing the present invention and is not to be construed as being limiting to other possible embodiments falling within the scope of the attached claim set.

DETAILED DESCRIPTION OF THE INVENTION

Reference is made to FIG. 2-5 schematically illustrating different embodiments of a ventilation system according to the present invention. The ventilation system according to the present invention can be operated in at least three modes of operation.

Figure 1:
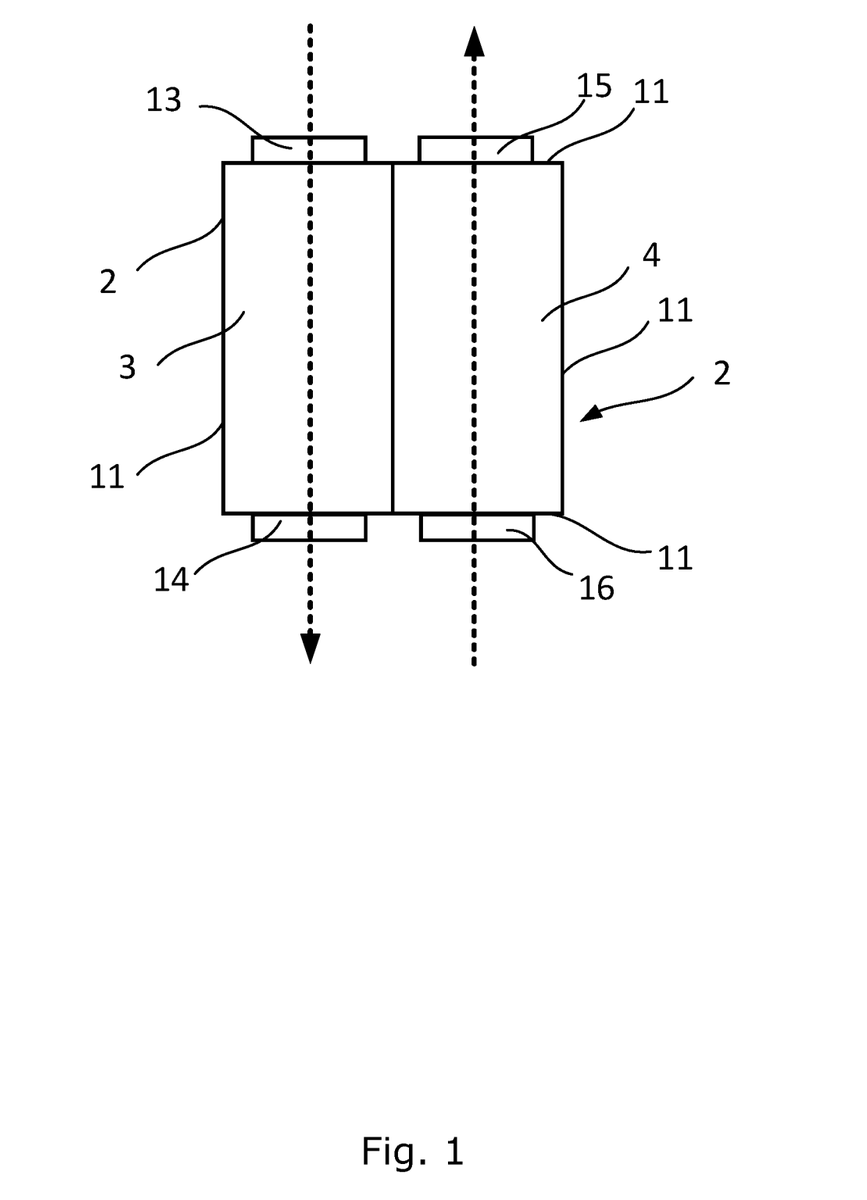
FIG. 1 is a schematic illustration of a housing of a ventilation system according to of the present invention.

Reference is made to FIG. 1 illustrating a schematic diagram of an embodiment of a housing of a ventilation system according to the present invention. The housing 2 comprises an inlet channel 3 configured for inletting air into a room, as well as an outlet channel 4 configured for outletting air from a room. The housing 2 further comprises a first inlet 13 in an outer wall 11 of the housing 2, for inletting air into the inlet channel 3 and a first outlet 14 in an outer wall 11 of the housing 2 for outletting air from the inlet channel 3, as well as a second inlet 15 for inletting air into the outlet channel 4 and a second outlet 15 for outletting air from the outlet channel 3.

Figure 2:
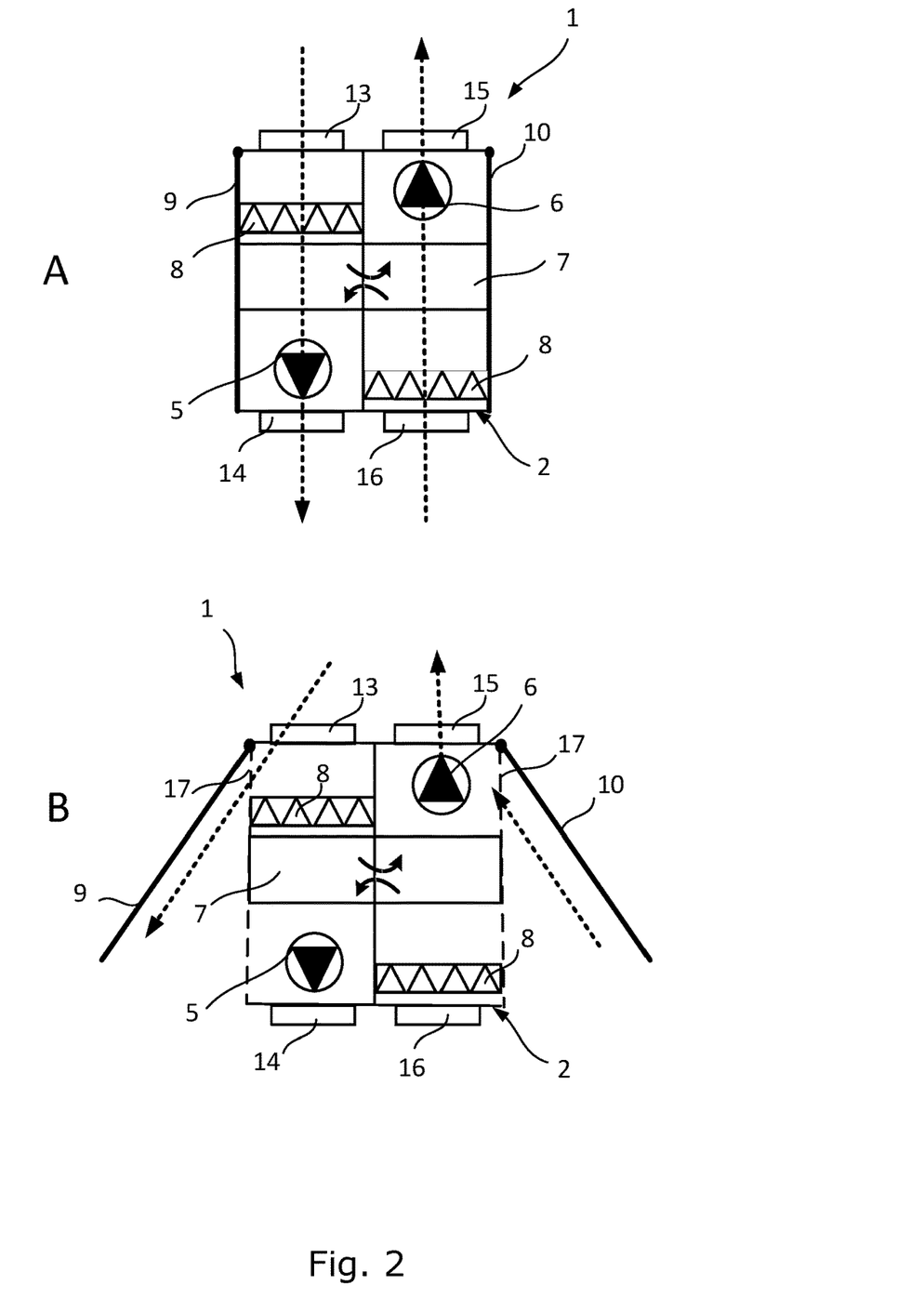
FIG. 2 is a schematic illustration of an embodiment of a ventilation system according to of the present invention, where the ventilation system is in a first mode of operation (2A) and in a second mode of operation (2B)

Reference is made to FIG. 2, illustrating a schematic diagram of an embodiment of a ventilation system according to the present invention. FIG. 2A illustrates the ventilation system in a first mode of operation, whereas FIG. 2B illustrates the ventilation system in a second mode of operation.

The ventilation system 1 illustrated in FIG. 2, comprises a housing 2 as illustrated in FIG. 1. The ventilation system 1 is configured to be installed in a room such that both the inlet channel 3 and the outlet channel 4 are each fluidly connected to both the room and an external environment outside the room.

The inlet channel 3 has a first inlet 13 for taking in air from the external environment, as well as a first outlet 14, for outletting air from the inlet channel 3 into the room to be ventilated. The outlet channel 4 has an second inlet 16 for inletting air from the room to be ventilated and a second outlet 15 for outletting air from the outlet channel 4 to the external environment.

A first fan 5 is arranged in the inlet channel 3 configured for providing a controllable volumetric airflow from the external environment to the room to be ventilated and a second fan 6 is arranged in the outlet channel 4 for providing a controllable volumetric airflow from the room to be ventilated to the external environment.

A heat exchanger 7 is arranged in said channels 3, 4 configured for exchanging heat between air flowing through the inlet channel 3 and air flowing through the outlet channel 4. The heat exchanger 7 comprise a first heat exchange section extending inside the inlet channel 3 and a second heat exchange section extending inside the outlet channel 4, wherein the first section and the second section are thermally coupled to exchange heat between the two sections.

An air filter 8 is arranged in each channel 3, 4 upstream of the heat exchanger 7, configured to filter air flowing into the heat exchanger 7. By upstream is meant arranged such that air is filtered for particles before it enters the heat exchanger 7. The air filters 8 ensure that the heat exchanger 7 surfaces are kept clean from dust, thus maintaining a high level of heat exchange efficiency. The air filters also ensure that the fans 5, 6 and other components and surfaces are kept clean from particulate matter, which is a benefit for functional, hygienic, and safety reasons.

The ventilation system 1 further comprises a first service door 9 and a second service door 10 arranged in the housing 2. The first service door 9 and a second service door 10 are each arranged in an outer wall 11 of the housing 2 and each have an open state and a closed state. When open, the service doors 9, 10 allow access to the air filters 8, such that the air filters 8 can be exchanged when needed.

As illustrated in FIG. 2A, the first and second service doors 9, 10 are both closed in a first mode of operation, whereas in a second mode of operation, as illustrated in FIG. 2B, the first and the second service doors 9, 10 are both open.

When the first service door 9 is closed, air is allowed to flow through the first inlet 13 in the housing 2 into the inlet channel 3, through the air filter 8 arranged in the inlet channel 3, through the first section of the heat exchanger 7 and out of the inlet channel 3 through a first outlet 14 in the housing 2.

When the second service door 10 is closed, air is allowed to flow through a second inlet 16 in the housing 2 into the outlet channel 4, through the air filter 8 arranged in the outlet channel 4, through the second section of the heat exchanger 7 and out of the outlet channel 4 through a second outlet 15 in the housing 2.

When the first service door is open, it provides access to the inlet channel 3 and when the second service door is open, it provides access to the outlet channel 4.

When the first service door 9 is open, an opening 17 is provided in the housing 2 allowing air in the inlet channel 3 to flow out of the inlet channel 2 and circumvent the heat exchanger 7 and the air filter 8 arranged in the outlet channel 4.

When the second service door 10 is open, an opening 17 is provided in the housing 2 allowing air to flow into the housing 2 and through the outlet channel 4, while circumventing the heat exchanger 7 and the air filter 8 arranged in the outlet channel 4.

Thus, when the first service door 9 is open, air is allowed to flow through the first inlet 13 into the inlet channel 3 and out of the opening 17 in first service door 9, without having to pass the air filter 8 or the heat exchanger 7 in the inlet channel 3.

In the same way, when the second service door 10 is open, air is allowed to flow through the second inlet 16 into the outlet channel 4 and out of the second outlet 15 into the external environment, without having to pass the air filter 8 or the heat exchanger 7.

In this way, the flow resistance is significantly decreased when the first service door 9 and/or second service door 10 are open compared to when they are closed, as air flowing through the ventilation system 1 does not have to pass through the air filters 8 and the heat exchanger 7.

Due to the decreased air flow resistance when air is allowed to bypass the air filters and the heat exchanger, power consumption is reduced in the second mode of operation, as the activity of at least one of the fans can be reduced without decreasing the volume of air being exchanged between the room and the external environment.

Thus, in the first mode of operation, the ventilation system 1 works as a conventional mechanical ventilation system, where both the first fan 5 and the second fan 6 need to be active to drive air through the housing 2.

However, in the second mode of operation, at least one fan is less active than in the first mode of operation and the ventilation system 1 may work as a natural ventilation system or a mechanically assisted natural ventilation system. If the first and/or second fan need to be active to drive air through the ventilation system, the ventilation system works as a mechanically assisted ventilation system. However, under certain climatic conditions, the fans are not needed to drive air through the housing 2 and may be inactive. In such situations, the ventilation system works as a natural ventilation system, where wind pressure and thermal buoyancy moves the air.

The ventilation system comprises a control system (not illustrated) configured for switching between the different modes of operations. More specifically, the control system is configured to individually open and close the first service door 9 and the second service door 10 using actuators, and individually change the discharge rate of the first fan 5 and the second fan 6.

Figure 3:
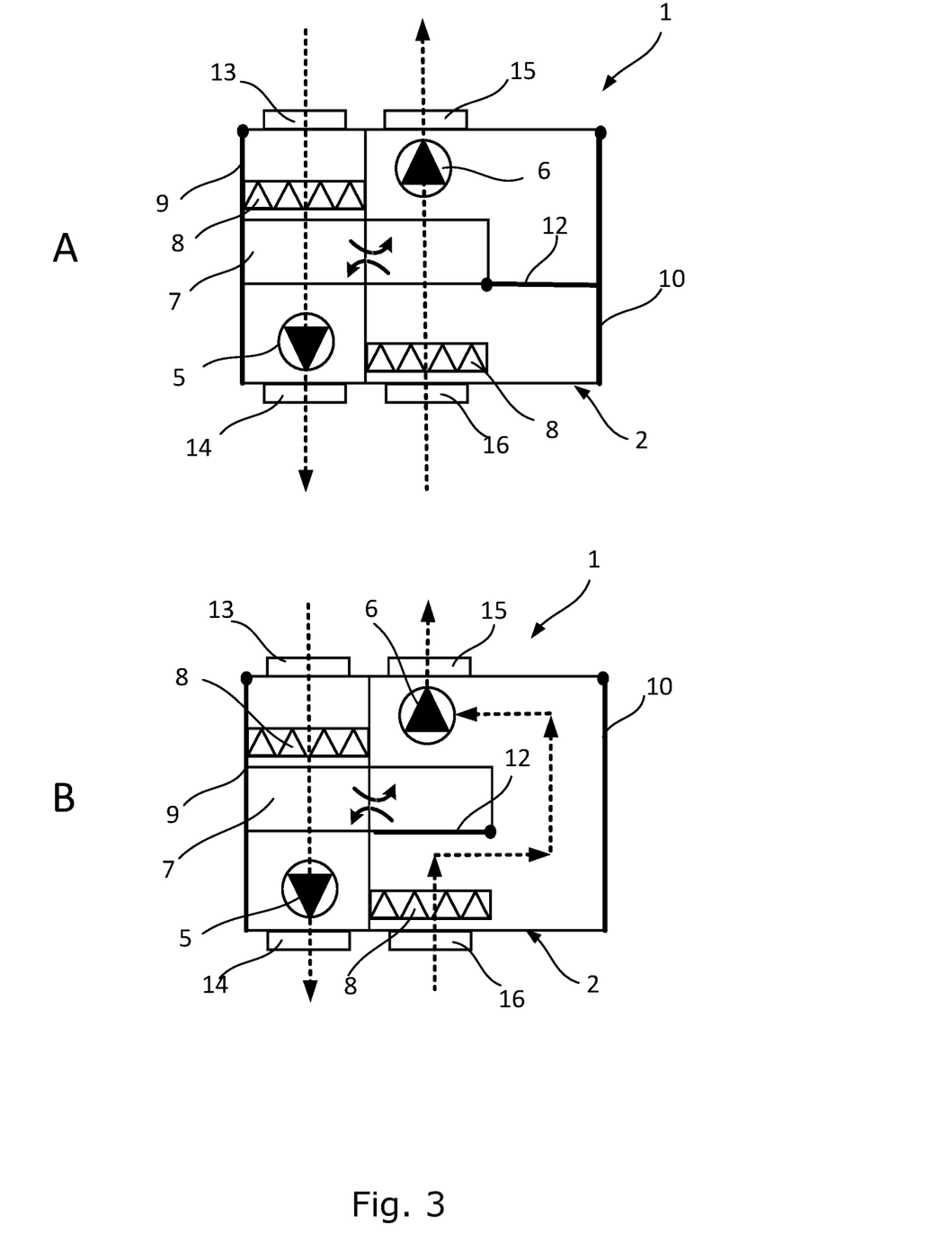
FIG. 3 is a schematic illustration of an embodiment of a ventilation system according to the present invention, where a bypass door is present in the outlet channel, and the ventilation system is in a first mode of operation.
Figure 4:
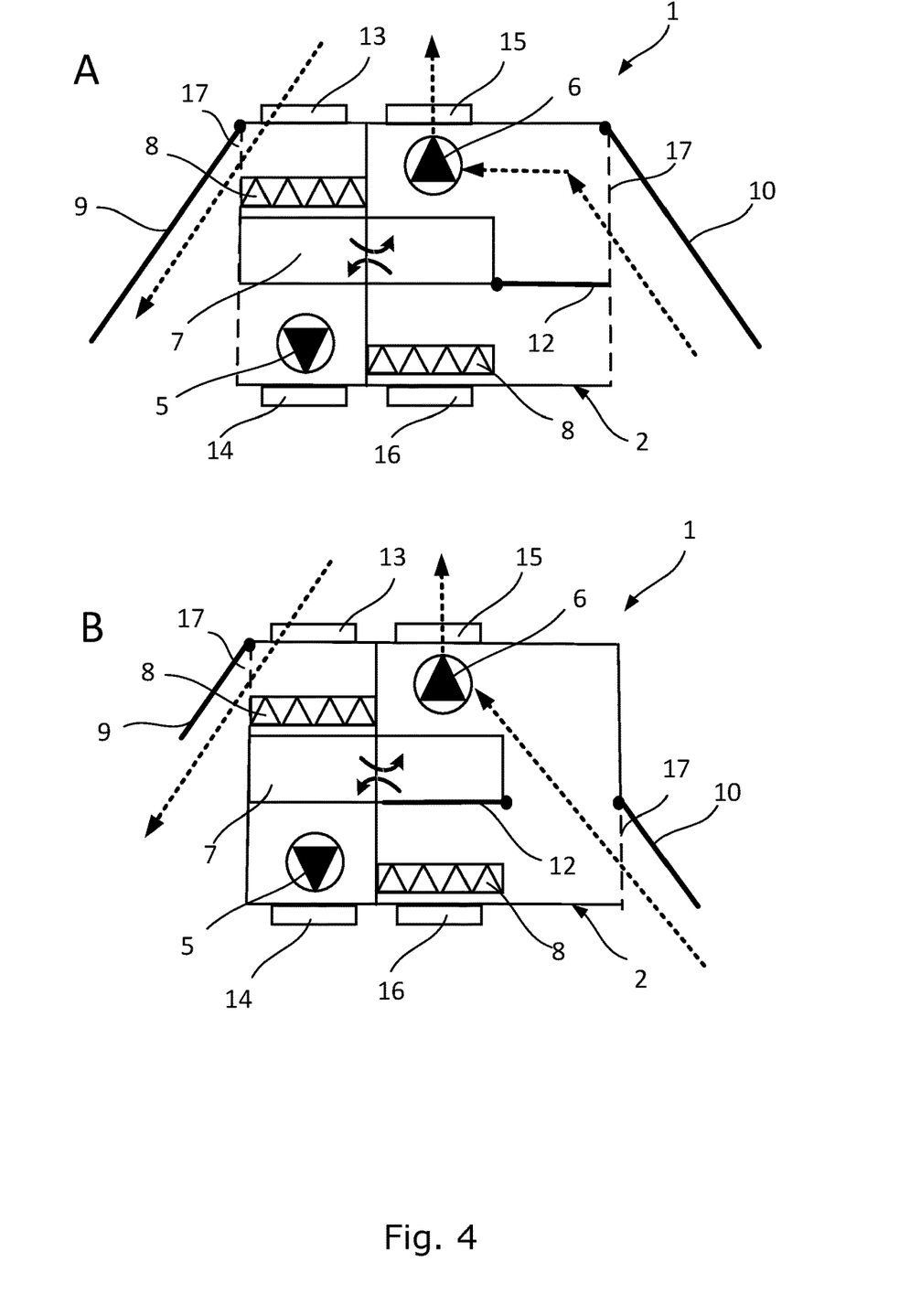
FIG. 4 is a schematic illustration of two embodiments of a ventilation system according to the present invention, where a bypass door is present in the outlet channel, and the ventilation system is in a second mode of operation.

FIGS. 3 and 4 illustrate a schematic diagram of several embodiments of the present invention, where the ventilation system 1 comprises a bypass mechanism.

FIG. 3 illustrates a ventilation system 1 in a first mode of operation, with two closed service doors 9, 10, whereas FIG. 4 illustrates two different embodiments of a ventilation system 1 in a second mode of operation, with two open service doors 9, 10.

Reference is made to FIG. 3, illustrating a schematic diagram of another embodiment of a ventilation system according to the present invention. The ventilation system illustrated in FIG. 3 is similar to that of FIG. 2, except that the ventilation system in FIG. 3 further comprises a bypass mechanism in the outlet channel 4.

The bypass mechanism comprises a bypass passage arranged to provide a passage for air bypassing the heat exchanger 7 and a bypass door 12 arranged to selectively close or open the bypass passage.

The control system may also be configured to open and close the bypass door 12.

In FIG. 3A, the bypass passage is closed, whereas in FIG. 3B, the bypass passage is open, allowing air in the outlet channel 4 to circumvent the heat exchanger 7 by instead flowing through a bypass passage.

In the embodiment illustrated in FIG. 3B, the open bypass door 12 prevents air in the outlet channel 4 from flowing through the heat exchanger 7, by blocking the heat exchanger 7. However, in other embodiments, the bypass door 12 may not block the heat exchanger 7 and air may still be allowed to flow through the heat exchanger 7, even when the bypass door 12 is open.

When air flows through the bypass passage and circumvents the heat exchanger 7, the air flow resistance is often decreased and the activity of at least one of the fans can often be reduced without decreasing the volume of air being exchanged between the room and the external environment.

FIGS. 4A and 4B illustrates a schematic diagram of two different embodiments of a ventilation system 1 in the second mode of operation.

In the second mode of operation both the first service door 9 and the second service door 10 are open and air is allowed to bypass the air filters 8 and the heat exchanger 7 in both the inlet channel 3 and outlet channel 4.

In the embodiment illustrated in FIG. 4A, the ventilation system is configured such that air is allowed to bypass both the air filter 8 and heat exchanger 7 in the outlet channel 4 when the second service door 10 is open, even if the bypass door 12 is closed. In the embodiment illustrated in FIG. 4B, the ventilation system is configured such that air is only allowed to bypass the air filter 8 and the heat exchanger 7 in the outlet channel 4 if both the second service door 10 and the bypass door 12 is open.

Figure 5:
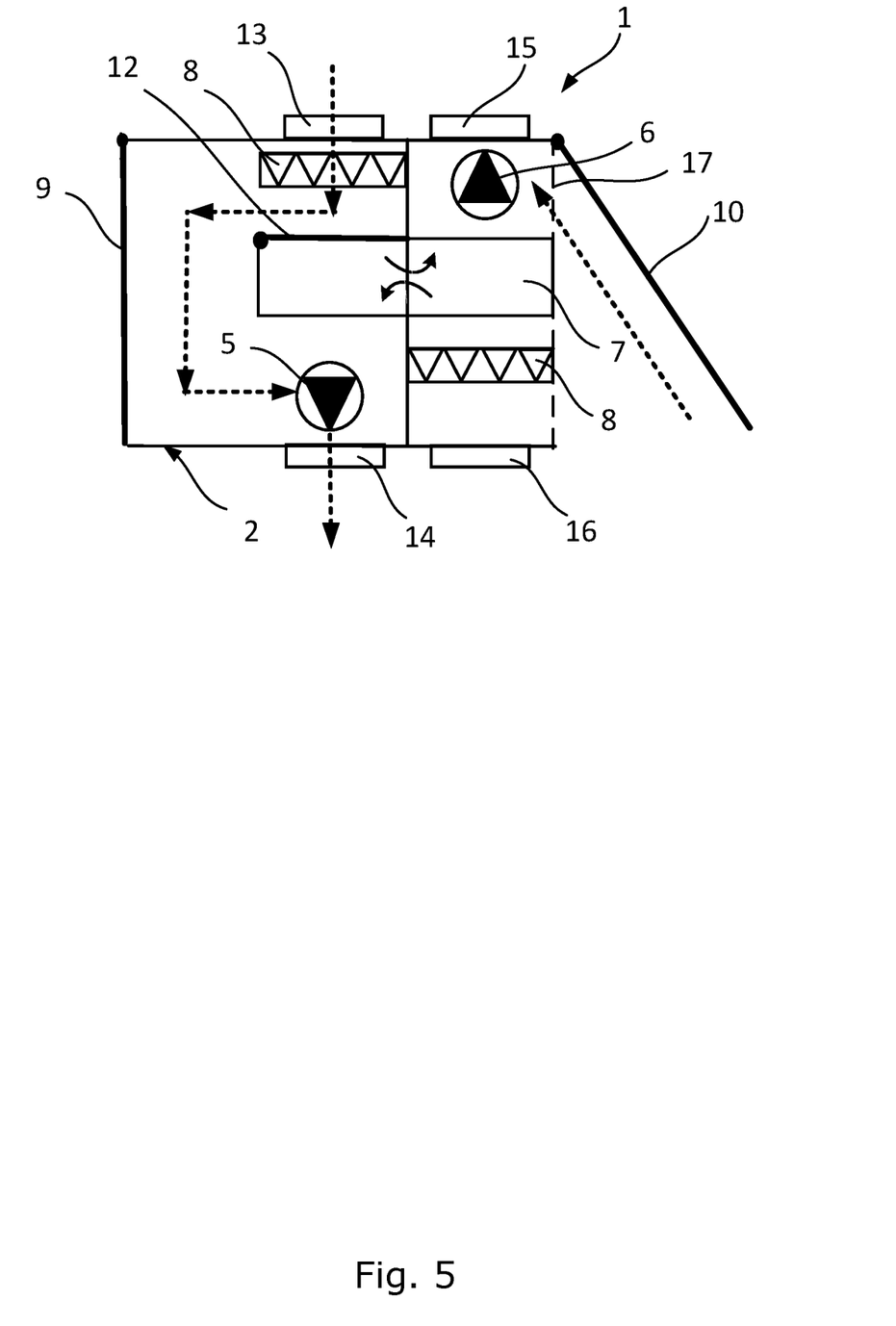
FIG. 5 is a schematic illustration of an embodiment of a ventilation system according to the present invention, where a bypass door is present in the inlet channel and the ventilation system is in a third mode of operation.

FIG. 5 illustrates a preferred embodiment of the ventilation system in a third mode of operation. The third mode of operation is an energy saving mode of operation.

The ventilation system illustrated in FIG. 5 is similar to that of FIG. 3, except that the ventilation system in FIG. 5 comprise the bypass mechanism in the inlet channel 3 instead of in the outlet channel 4 and only the second service door 10 is open.

In this embodiment, air flowing in both the inlet channel 3 and the outlet channel 4 is allowed to bypass the heat exchanger 7, even though only the second service door 10 is open. Furthermore, air flowing in the outlet channel 4 is allowed to bypass the air filter 8 arranged in the outlet channel 4. Thus, air flow resistance is reduced in both channels 3, 4, and power consumption can be reduced by reducing the activity of at least one of the fans 5, 6, without decreasing the volume of air being exchanged between the room and the external environment.

In that way, air flowing through the inlet channel 3 is filtered, but bypasses the heat exchanger 7, whereas air flowing through the outlet channel 4 bypasses both the air filter arranged in the outlet channel 4, as well as the heat exchanger 7.

In reality, the embodiment illustrated in FIG. 5 can be obtained by using a ventilation system as illustrated in FIG. 3 or 4 and flipping the ventilation system, such that the inlet channel 3 becomes the outlet channel 4 and visa versa.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A decentralized hybrid ventilation system comprising a housing having
   an inlet channel for inletting air into a room and an outlet channel for outletting air from a room;
   a first fan arranged in the inlet channel for providing a controllable volumetric airflow through the inlet channel and a second fan arranged in the outlet channel for providing a controllable volumetric airflow through the outlet channel;

a heat exchanger configured for exchanging heat between air flowing through the inlet channel and air flowing through the outlet channel;

an air filter arranged in each channel upstream of the heat exchanger for filtering air flowing into the heat exchanger;

a first service door and a second service door each arranged in an outer wall of the housing and each have an open state and a closed state, wherein when in an open state the first service door provides an opening in the housing allowing air in the inlet channel to flow out of the inlet channel and circumvent the heat exchanger and/or the air filter arranged in the inlet channel; and the second service door provides an opening in the housing allowing air to flow into the housing and through the outlet channel, while circumventing the heat exchanger and/or the air filter arranged in the outlet channel; and a control system, wherein the ventilation system comprises actuators, and the control system is configured to selectively open and close the first service door and second service door using said actuators.

2. A decentralized hybrid ventilation system according to claim 1, wherein the control system is configured to switch between different modes of operations, wherein in a first mode of operation, the first and second service doors are both closed;

in a second mode of operation the first and the second service doors are both open; and in a third mode of operation, one service door is open while the other service door is closed.

3. A decentralized hybrid ventilation system according to claim 1, wherein the outlet channel and/or the inlet channel comprise a bypass passage allowing air to bypass the heat exchanger; and a bypass door configured to selectively close or open the bypass passage.

4. A decentralized hybrid ventilation system according to claim 3, wherein the bypass door when arranged to open the first bypass passage is arranged so as to prevent air from flowing into the heat exchanger.

5. A decentralized ventilation system according to claim 3, wherein the control system is further configured to selectively open and close the bypass door using actuators.

6. A decentralized ventilation system according to claim 3, wherein the control system is configured to perform the following steps:

(i) individually open and close the first service door and the second service door;

(ii) open and close the bypass door, if present; and (iii) individually change the discharge rate of the first fan and the second fan;

to switch between the different modes of operation.

7. A decentralized hybrid ventilation system according to claim 2, wherein the control system is configured such that in the first mode of operation, the first fan is active and the second fan is active; and in the second and/or third mode of operation, at least one of the first fan and the second fan is less active than in the first mode of operation.

8. A decentralized hybrid ventilation system according to claim 2, wherein the first fan and/or second fan are inactive in the second and/or third mode of operation.

9. A decentralized ventilation system according to claim 2, wherein the ventilation system further comprises one or more temperature sensors arranged for detecting the temperature of air in the inlet channel and/or the outlet channel, wherein the control system is configured to switch between the different modes of operation in dependence on the detected temperature to achieve or maintain a target temperature accessible to the control system.

10. A decentralized ventilation system according to claim 2, wherein the control system is programmed to switch between the different modes of operation in a pre-determined frequence and/or in dependence of several inputs, such as temperature in the inlet channel and/or outlet channel.

11. A decentralized ventilation system according to claim 2, wherein the ventilation system further comprise a user interface allowing a user to instruct the control system of a frequence in which to switch between the different modes of operation.

12. A decentralized ventilation system according to claim 1, wherein the ventilation system is configured such that with the first service door closed, air flows through a first inlet in the housing into the inlet channel, through the air filter arranged in the inlet channel, through a first section of the heat exchanger and out of the inlet channel through a first outlet in the housing;

with the first service door open, air flows through the first inlet into the inlet channel and out of the inlet channel through the opening provided by the open first service door, without flowing through the heat exchanger and/or without flowing through the air filter arranged in the inlet channel;

with the second service door closed, air flows through a second inlet in the housing into the outlet channel, through the air filter arranged in the outlet channel, through a second section of the heat exchanger and out of the outlet channel through a second outlet in the housing; and with the second service door open, air flows into the outlet channel through the opening provided by the open second service door and out of the outlet channel through the second outlet, without flowing through the heat exchanger and/or without flowing through the air filter arranged in the outlet channel.

13. A master control system configured for controlling ventilation in a building, wherein the master control system is in communication with a plurality ventilation systems according to claim 1, wherein the plurality of ventilation system are arranged in different rooms in the building and each ventilation system has a mode of operation, and wherein the master control system controls the mode of operation of each ventilation system based on input from different sensors arranged in the building.

* * * * *